United States Patent
Srivastava et al.

(10) Patent No.: US 7,287,075 B2
(45) Date of Patent: Oct. 23, 2007

(54) SYSTEM FOR MONITORING MANAGED SERVER HEALTH

(75) Inventors: Rahul Srivastava, Randolph, NJ (US); Ananthan Bala Srinivasan, San Francisco, CA (US); Eric M. Halpern, San Francisco, CA (US); Dean Bernard Jacobs, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 66 days.

(21) Appl. No.: 10/339,144

(22) Filed: Jan. 9, 2003

(65) Prior Publication Data

US 2003/0229804 A1 Dec. 11, 2003

Related U.S. Application Data

(60) Provisional application No. 60/359,009, filed on Feb. 22, 2002.

(51) Int. Cl.
*G06F 15/173* (2006.01)
*G06F 11/00* (2006.01)

(52) U.S. Cl. ............ 709/224; 709/223; 709/224; 714/4; 714/25

(58) Field of Classification Search ........ 709/223, 709/224, 206, 219, 221; 710/3, 4, 10; 713/153, 713/201; 714/11, 25, 47, 4, 48
See application file for complete search history.

(56) References Cited

U.S. PATENT DOCUMENTS

| | | | |
|---|---|---|---|
| 5,293,024 A * | 3/1994 | Sugahara et al. ...... | 219/121.67 |
| 5,500,940 A | 3/1996 | Skeie ................. | 714/25 |
| 5,819,028 A | 10/1998 | Manghirmalani et al. ..... | 714/57 |
| 5,862,333 A * | 1/1999 | Graf .................. | 709/223 |
| 6,021,262 A | 2/2000 | Cote et al. | |
| 6,058,420 A * | 5/2000 | Davies ................ | 709/224 |
| 6,085,243 A | 7/2000 | Fletcher et al. ....... | 709/224 |
| 6,170,067 B1 | 1/2001 | Liu et al. ............. | 714/48 |
| 6,182,157 B1 | 1/2001 | Schlener et al. ....... | 709/318 |
| 6,457,142 B1 * | 9/2002 | Klemm et al. ......... | 714/38 |
| 6,467,054 B1 * | 10/2002 | Lenny ................. | 714/42 |
| 6,493,749 B2 * | 12/2002 | Paxhia et al. ......... | 709/220 |
| 6,631,409 B1 * | 10/2003 | Watson et al. ......... | 709/224 |

(Continued)

OTHER PUBLICATIONS

Guigoussou, M.H., "A Java API for Advanced Faults Management," 2001, IEEE.

(Continued)

*Primary Examiner*—Ario Etienne
*Assistant Examiner*—Gregory G Todd
(74) *Attorney, Agent, or Firm*—Fliesler Meyer LLP (57) ABSTRACT

A Node Manager monitors the status of multiple servers. The Node Manager detects server failures, periodically monitors server health status, and performs server maintenance. When the Node Manager detects a server failure, it determines whether or not the server should be restarted. While periodically monitoring servers, the Node Manager may determine how often to trigger a health check, how long to wait for a response, and how to proceed if the server is deemed failed. The Node Manager may be controlled by an Administrative Server directly or by an external administrative agent. An administrative agent may control the Node Manager by interfacing with the Administrative Server. The Node Manager and AS may authenticate each other and encode their communications to each other for increased security.

11 Claims, 5 Drawing Sheets

U.S. PATENT DOCUMENTS

| | | | |
|---|---|---|---|
| 6,681,342 B2 | 1/2004 | Johnson et al. | 714/30 |
| 6,732,269 B1* | 5/2004 | Baskey et al. | 713/153 |
| 6,738,811 B1* | 5/2004 | Liang | 709/224 |
| 6,760,736 B2* | 7/2004 | Waldo et al. | 707/206 |
| 6,785,840 B1 | 8/2004 | Smith et al. | |
| 6,859,834 B1* | 2/2005 | Arora et al. | 709/227 |
| 6,947,560 B1* | 9/2005 | Smeets et al. | 380/44 |
| 7,000,193 B1* | 2/2006 | Impink et al. | 715/771 |
| 7,139,805 B2* | 11/2006 | Seagren et al. | 709/207 |
| 7,233,989 B2* | 6/2007 | Srivastava et al. | 709/224 |
| 2001/0044841 A1 | 11/2001 | Kosugi et al. | |
| 2002/0007410 A1* | 1/2002 | Seagren et al. | 709/227 |
| 2002/0016911 A1* | 2/2002 | Chawla et al. | 713/153 |
| 2002/0091815 A1 | 7/2002 | Anderson et al. | |
| 2003/0036886 A1* | 2/2003 | Stone | 702/188 |
| 2003/0037289 A1* | 2/2003 | Singh et al. | 714/38 |
| 2003/0055952 A1* | 3/2003 | Motoyama et al. | 709/224 |
| 2003/0069953 A1 | 4/2003 | Bottom et al. | |

OTHER PUBLICATIONS

"Java Management Extension (JMX)," 1999, Sun Microsystems.

* cited by examiner

SYSTEM FOR MONITORING MANAGED SERVER HEALTH

CLAIM TO PRIORITY

The present application claims the benefit of priority under 35 U.S.C. §119(e) to U.S. Provisional Patent Application entitled "ECS NODE MANAGER FOR ENSURING HIGH AVAILABILITY SERVER AND APPLICATION", Patent Application No. 60/359,009, filed on Feb. 22, 2002, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following United States patents and patent applications, which patents/applications are assigned to the owner of the present invention, and which patents/applications are incorporated by reference herein in their entirety:

U.S. patent application Ser. No. 10/339,469, entitled "METHOD FOR AUTOMATIC MONITORING OF MANAGED SERVER HEALTH", filed on Jan. 09, 2003, currently pending, which claims priority to provisional United States Patent Application entitled "ECS NODE MANAGER FOR ENSURING HIGH AVAILABILITY SERVER AND APPLICATION", Patent Application No. 60/359,009, filed on Feb. 22, 2002;

U.S. patent application Ser. No. 10/338,981, entitled "METHOD FOR EVENT TRIGGERED MONITORING OF MANAGED SERVER HEALTH", filed on Jan. 09, 2003, currently pending, which claims priority to provisional United States Patent Application entitled "ECS NODE MANAGER FOR ENSURING HIGH AVAILABILITY SERVER AND APPLICATION", Patent Application No. 60/359,009, filed on Feb. 22, 2002;

U.S. patent application Ser. No. 10/340,496, entitled "METHOD FOR INITIATING A SUB-SYSTEM HEALTH CHECK", filed on Jan. 10, 2003, currently pending, which claims priority to provisional United States Patent Application entitled "Server Self-Health Monitor", Patent Application No. 60/359,010, filed on Feb. 22, 2002;

U.S. patent application Ser. No. 10/340,227, entitled "METHOD FOR MONITORING A SUB-SYSTEM HEALTH", filed on Jan. 10, 2003, currently pending, which claims priority to provisional United States Patent Application entitled "Server Self-Health Monitor", Patent Application No. 60/359,010, filed on Feb. 22, 2002; and U.S. patent application Ser. No. 10/340,002, entitled "SYSTEM FOR MONITORING A SUBSYSTEM HEALTH", filed on Jan. 10, 2003, currently pending, which claims priority to provisional United States Patent Application entitled "Server Self-Health Monitor", Patent Application No. 60/359,010, filed on Feb. 22, 2002.

FIELD OF THE INVENTION

The present invention relates generally to managing a network of servers, and more particularly to monitoring the health of a network of servers.

BACKGROUND OF THE INVENTION

As computer and computer systems have evolved over the years, the processes they implement have evolved in their complexity. One approach to implementing computer processes to solve more complex problems is to assign a number of computers to handle different parts of a process. Each part or task may be handled by different computers, computer objects, applications, or servers, hereafter referred to collectively as servers. These servers make up a distributed network. Within the network, different servers may handle functions such as management, data base maintenance, accessibility, server boot-up, shut-down, and so forth.

Servers within a distributed network perform transactions with other servers and use resources within the system. As the servers require the use of other servers and resources, the operability and reliability of the servers become more important. If a server fails while performing a task, it may affect other servers and resources that were tied up in transactions with the server at the time of its failure. Whether a server has failed completely or the server's condition has degraded is important information to a network. Thus, it is important to know the status of a server in order to maintain the health of the server and the network in which it operates. A maintenance system should be able to require a server to provide health information and be able to maintain or correct servers not operating properly.

What is needed is a system for monitoring and inquiring into the health of a server and for taking corrective action if deemed appropriate.

SUMMARY OF THE INVENTION

In one embodiment of the present invention, a Node Manager (NM) monitors the status of multiple servers. The NM detects server failures, periodically monitors server health status, and performs server maintenance. When the NM detects a server failure, it determines whether or not the server is restartable. If the server is restartable, the NM checks to see if any other conditions exist that limit the server from being restarted. If no other conditions exist, the server is restarted. If the failed server is not restartable or other conditions exist preventing the server from being restarted, the failed server is not restarted.

In another embodiment of the present invention, the NM periodically monitors the health of a server whether or not the NM detects a server failure. This process begins when the NM makes a health query to a server. Then, the NM waits for a server response containing the server's health information. If the server replies that it is healthy, the NM continues to monitor the server. If the server's reply indicates the server's health is degenerate or the server does not reply at all, the NM presumes the server has failed. The NM may wait a specified period of time before deciding the server has failed to respond to a query. Once a server is deemed failed, the NM then determines whether to terminate the server.

The NM may be controlled by parameters located within the NM or Administration Server (AS). The parameters may be burned into system software or modified at runtime. In another embodiment, the NM may be controlled by an external administrative agent. An administrative agent may control the NM by interfacing with the AS. For increased security, the NM and AS may authenticate each other and encode their communications between each other.

DETAILED DESCRIPTION

A self health monitoring system may be composed of several nodes. A node may be a single physical machine or take some other form. In one embodiment of the present invention, each node has a Node Manager (NM), an Administration Server (AS), and several other managed servers or server instances. The AS and NM may send and transmit messages to each other. The NM may also send and transmit messages with the other servers located on the node.

In one embodiment, the NM performs two primary functions. First, the NM automatically detects and restarts failed servers. The NM continually monitors servers running on the local machine. Upon detecting a server has failed, the NM will automatically restart the failed server. The server restart may occur as soon as the NM detects the server failure. Secondly, the NM periodically monitors and restarts failed or degenerate servers. The NM will periodically monitor servers running on the local machine. When the NM detects that a server is less than healthy, the NM may restart the server depending on server parameters and the condition of the server. In one embodiment, runtime java MBeans hosted on the AS are used in conjunction with the NM to achieve these functions. The runtime java MBeans offer the functionality of the NM and the health information acquired by the NM to clients in a programmatic manner.

Figure 1:
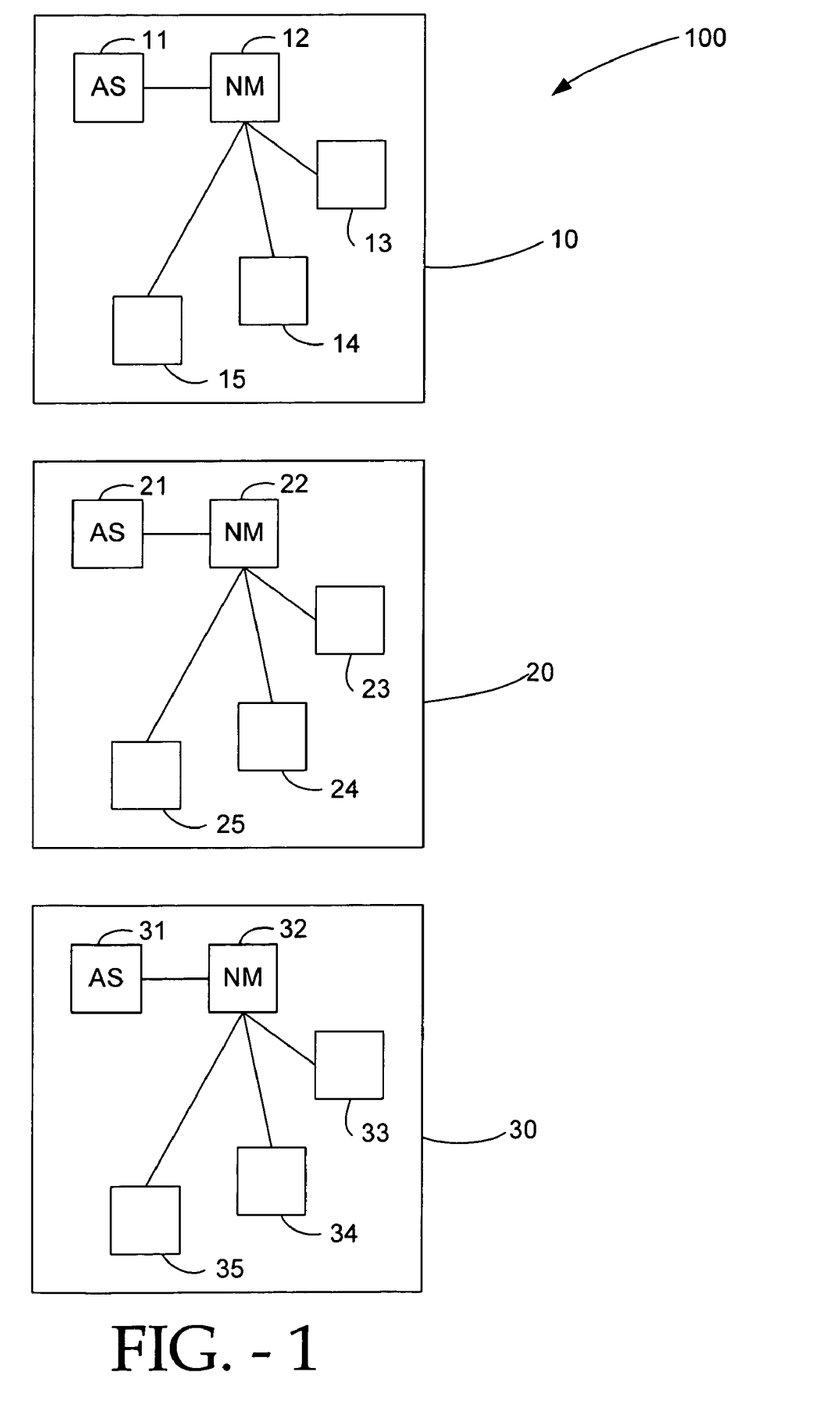
FIG. 1 is a block diagram of several nodes having servers in a self health monitoring system in accordance with one embodiment of the present invention.

FIG. 1 depicts a self health monitoring system 100 in accordance with one embodiment of the present invention. As shown, system 100 includes a first node 10, a second 20, and a third node 30. Each node may contain an AS 11, 21, and 31, and an NM 12, 22, and 32, respectively. In each node, the AS communicates with the NM. In one embodiment of the present invention, the AS and the NM communicate through a (SSL) secure socket layer connection. Each node also contains at least one managed server. In one embodiment, these managed servers may be composed of server instance processors or logic servers all located on one hardware machine. Hereinafter, the term "server" shall be understood to include server instance processors, server instance logic, and other managed servers. A node may be one physical machine with servers that communicate with other servers on the same machine. As shown in FIG. 1, node 10 includes servers 13-15, node 20 includes servers 23-25, and node 30 includes servers 33-35. An NM may communicate with the servers within the particular NM's node. For example, NM 12 can communicate with servers 13, 14, 15, all within node 10. In one embodiment, the NM communicates with the servers within its node through a secure socket layer connection.

Figure 2:
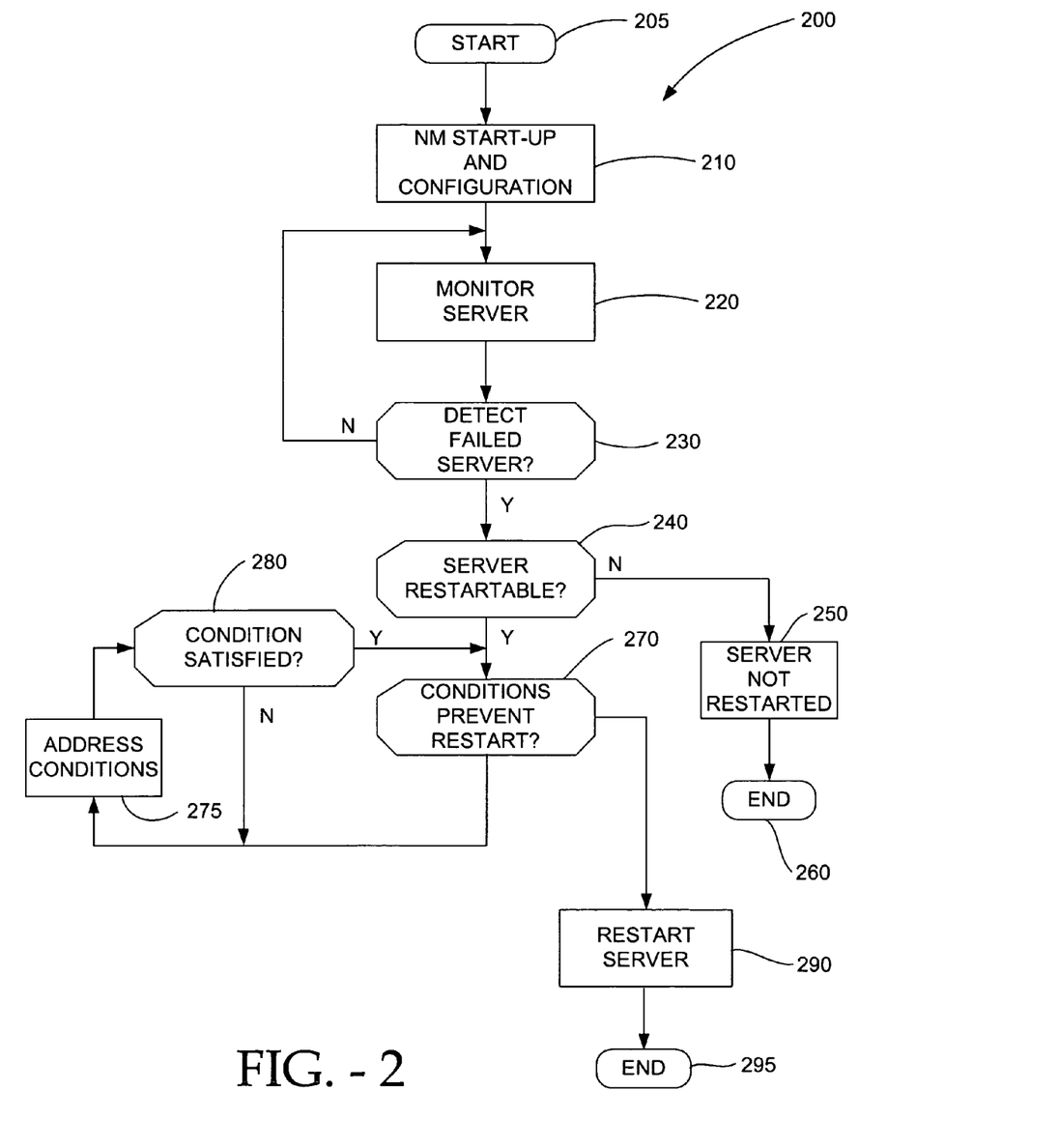
FIG. 2 is a diagram showing the operation of the automatic monitoring system of a Node Manager in accordance with one embodiment of the present invention.

In accordance with one embodiment of the present invention, the operation of an automatic monitoring system for detecting failed servers in the self health monitoring system of FIG. 1 is shown in flow chart 200 of FIG. 2 and described as follows. The operation of an NM starts at step 205. Next, the NM undergoes start-up and configuration operations in step 210. In one embodiment of the present invention, the NM receives instructions from an AS at start-up. The AS may instruct the NM to start an instance on a local machine. The AS may also instruct the NM to provide information to the AS regarding servers previously monitored during previous monitoring periods by the NM. The NM may assume that all of the monitored servers are alive upon NM startup and sets each server state to "unknown". In step 220, the NM begins monitoring a server. In one embodiment, the server is monitored over an SSL connection established with the server. In another embodiment, the server is monitored over a plain text protocol connection or some other type of connection.

The NM determines if a server has failed in step 230. In one embodiment, the server failure is detected by a breakdown of the connection between the NM and the server. In these embodiments, the NM monitors the server by confirming the integrity of the connection between the NM and the server. When the server being monitored dies, the NM is notified accordingly. In one embodiment, the NM receives an IOException error when the server dies. The integrity of the connection may also be verified in other ways, all considered within the scope of the invention. If the NM does not detect a failed server, operation of the system returns to step 220 to continue monitoring the server.

If the NM does detect a failed server in step 230, the NM will determine if the server is restartable in step 240. In one embodiment, a restart parameter specifies whether the server should be restarted upon detecting a server failure. The restart parameter may reside on the server, the NM, or in some other memory location. The parameter may be defined per server instance or for a number of servers. The parameter may also be modifiable at runtime though commands issued through the AS. If the server is not restartable, operation continues to step 250 and the server is not restarted. In one embodiment, a message is written to a log file indicating that the server is not restartable and no further action is taken by the NM towards the failed server. Once the event is recorded, the process ends at step 260 and the NM ceases monitoring the failed server. Though no further action is performed on the server at step 260, the server may be monitored again beginning at step 220 if the server is restarted or at step 205 if the NM is restarted.

If the server is deemed restartable in step 240, operation of the system continues to step 270. At step 270, the system checks to confirm that no other conditions exist to prevent the server from being restarted. If at step 270 any conditions exist preventing a server restart, then system operation proceeds to step 275. In step 275, an action or inaction is taken to address the condition that is preventing the server from being restarted. The action or inaction may be taken by either the NM, AS, or some other server. After the condition is addressed in step 275, the system determines whether the condition is satisfied in step 280. If the condition is not satisfied in step 280, operation returns to step 275. If the condition is satisfied in step 280, operation continues to step 270. In one embodiment of the present invention, operation continues from step 275 to step 270 whether the condition is satisfied or not. In yet another embodiment of the present invention, the NM will check to see if the server may be restarted after each time a restart is considered in step 270. In this embodiment (not shown), operation continues from step 275 or step 280 to step 240. In any case, the results of step 280 may be recorded in a log or memory as either condition satisfied, condition not satisfied, or some other message. If at step 270 the conditions are satisfied, then operation continues to step 290.

In one embodiment, system conditions may exist at step 270 that limit the server to a maximum number of restarts allowed during a period of time. In this case, parameters may control the maximum number of server restarts permitted within the period of time and the length of the time period. The number of actual restarts for a particular server may be indicated by a restart counter. If at step 270, the value in the maximum restarts allowed parameter is larger than the restart counter, then the maximum number of restarts has not occurred during the current time period and the process continues to step 290. If the restart counter value is larger than the maximum number of server restarts permitted within the particular time period, then operation continues to step 280. Operation of the system may remain at step 280 until the current time period has elapsed. Once the time period has elapsed, the restart counter is reset to zero and the time period begins again. The system then continues to step 270. At step 270, the restart counter is again compared to the maximum number of restarts parameter and operation continues accordingly. In another embodiment, system operation will continue past step 280 even though the maximum start parameter has been exceeded. In this case, a message is logged regarding this event and operation continues. System operation in this embodiment will consist of a loop between step 270 and step 280 until the time period has elapsed and the restart counter is reset to zero.

At step 290, the server is restarted. Then, the NM, server, or AS may perform actions or process events. In one embodiment, the server restart counter is incremented. In another embodiment, certain server parameters may be configured to take effect upon the next server incarnation.

Parameters determine how a NM is to act upon detecting server failure. Examples of these parameters in one embodiment of the present invention are shown below. These parameters can be defined per server instance and modified at runtime via the Admin Console.

AutoRestartEnabled=<true|false>

This parameter specifies whether the servers are restartable or not. In one embodiment, the default is true.

RestartIntervalSeconds=<number of seconds>

If a Server is restartable, this parameter specifies that it can be restarted RestartMax times within the specified number of seconds. In one embodiment, the default is 3600 seconds (60 minutes).

RestartMax=<number>

If Servers are restartable, this parameter specifies the max # times a Server can be started within the period specified by RestartIntervalSeconds. In one embodiment, the default is 2.

Certain methods implemented in java may be used to access or modify the parameter examples listed above. Examples of these methods include boolean getAutoRestartEnabled(), void setAutoRestartEnabled(boolean), int getRestartIntervalSeconds(), void setRestartIntervalSeconds(int), int getRestartMax(), and void setRestartMax(int).

In addition to detecting the failure of a server, the NM may monitor the health of a server or perform maintenance on a server. The NM may monitor server health or perform server maintenance without detecting a change or degradation in the health status of the server. Server maintenance and monitoring may be performed simultaneously on multiple servers at any time. The simultaneous monitoring and maintenance may be synchronous or asynchronous. The operation of a system for monitoring the health of a server with a NM in accordance with one embodiment of the present invention is shown in diagram 300 of FIG. 3 and described as follows. Health monitoring system operation 300 starts off with a start step 310. Next, the system determines whether the NM should begin monitoring a server in step 320. If the system determines the NM should monitor the particular server, operation continues to step 330. If the system determines the particular server should not be monitored at the current time, the NM will not monitor the current server. In one embodiment, a server will not be monitored until a period of time has passed since the server has been restarted. In this case, a monitor delay parameter will determine the period of time the NM shall wait before monitoring the restarted server. The delay parameter may be stored by the AS, NM, or the server itself. The delay parameter may correspond to a particular server or several servers. In one embodiment of the present invention, the value of the delay parameter may be modified at server runtime.

Figure 3:
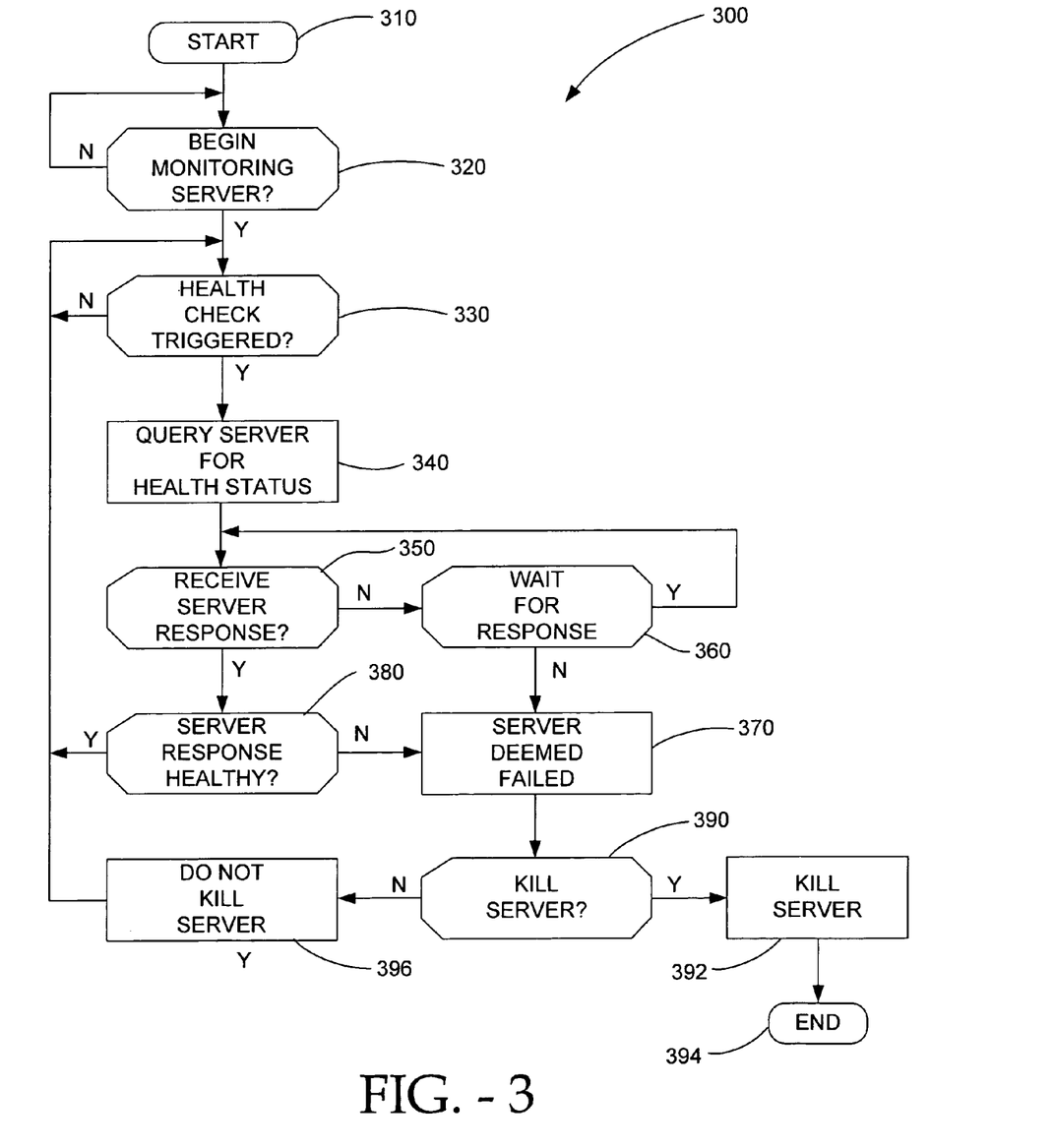
FIG. 3 is a diagram showing the operation of a health monitoring and corrective action system of a Node Manager in accordance with one embodiment of the present invention.

Next, the NM determines if a health check is triggered for a particular server in operation 330. A health check may be triggered by an internal event in the NM. In another embodiment, the health check is triggered by an external event occurring outside the NM, the occurrence of which is communicated to the NM. In one embodiment, a health check is triggered for a server after a period of time has elapsed. In this case, a health check interval parameter may specify a period of time. The expiration of the time period specified by the interval parameter will trigger a health check for a server. In one embodiment, an interval parameter corresponds to a single server. In another embodiment, an interval parameter corresponds to several servers. In any case, the interval parameter may be modified at server runtime. If a health check is not triggered in step 330, the system continues in a standby state waiting for a triggering event to occur regarding a particular server. If a health check triggering event does occur, system operation continues to step 340.

In step 340, the NM queries a server for it's health status. In one embodiment of the present invention, the NM invokes a java servlet located on the server to return the server's health status to the NM. This java servlet is an asynchronous servlet that will return the server's health information upon the occurrence of a particular event. In one embodiment, the event is the elapse of a period of time. The NM may inquire about the server's health status by communicating with the server itself or a server self health monitor application running on the server. The query may be transmitted over a TCP connection established between the NM and server or in some other manner. After querying the server for it's health status, the NM determines if a response is received from the server in step 350. In one embodiment, there are at least three possible response scenarios between the NM and the server subject to the NM's inquiry. In the first scenario, the server may be unable to receive the NM's query. The server may be too busy to accept a connection from the NM. In another scenario, the server may have failed and be unable to accept an NM connection request. In either case, the NM may throw an IOException and consider the server as "failed". The NM would then set an internal value of the server state to "failed". In the final scenario, no response is received from the server although the NM and server have established an initial connection. In this case, the NM will wait for a response from the server for a specified period of time. In one embodiment, a timeout parameter may specify the period of time the NM will wait for a response from the server. Until the length of time specified in the timeout parameter has transpired, the NM will continue to wait for a response as indicated in the loop of steps 350 and 360. If the NM has not received a response from the server in step 350 and the NM has determined not to wait any longer to receive a response in operation 360, operation continues to step 370 where the server is deemed failed. In one embodiment, the NM may attempt to inquire about the delay of the response or resend a health inquiry to the server before proceeding from to 370. In this embodiment, the NM may proceed to step 350, 360, or 380 depending on the result of the delay inquiry or the health inquiry.

If the NM does receive a response in step 350, operation flows to step 380 where the NM interprets the server's response. The NM interprets the server's response to determine if the server is healthy. If the NM determines the server is healthy from the response received by the server, operation flows to step 330 where the NM waits for another health check to be triggered. If the NM determines that the server is not healthy in step 380, operation continues to step 370. In step 370, the NM deems the server has failed. In one embodiment, the NM sets a parameter indicating the state of the particular server to "failed". The parameter may be stored internally within the NM, in the AS, or at some other memory location. Once deemed failed, operation continues to step 390 where the NM determines whether to terminate the server. In one embodiment, the NM contains an auto-terminate parameter. The auto-terminate parameter may relate to a single server or multiple servers at once. A user may set a value for the auto-terminate parameter or the parameter may be preset by the system. If the auto-terminate parameter indicates the server should not be terminated upon server failure, then operation continues to step 396. In one embodiment of the present invention, the system enters a message in a log indicating the failed status of the server and that the server is not to be restarted. After step 396, system operation proceeds to step 330. If the auto-terminate parameter indicates the server should be terminated upon server failure in step 390, then operation continues to step 392. The failed server is terminated in step 392. In one embodiment of the present invention, an entry is made to a log indicating the server is deemed failed and that the server was terminated. Monitoring of the terminated server ends in step 394. Once the server is terminated, the automatic detection system of FIG. 1 may detect the terminated server at step 230. The NM may then proceed to determine whether to restart the server as shown in FIG. 1.

In one embodiment of the present invention, certain parameters will control how the server periodically checks the servers running on the local machine. Examples of parameters controlling the check are shown below.

HealthCheckIntervalSeconds=<number of seconds>

This parameter specifies the interval of time (in seconds) between which periodic scans are done by NM to check if Servers are Failed. In one embodiment, the default is 180 seconds.

HealthCheckTimeoutSeconds=<number of seconds>

This parameter specifies the length of time (in seconds) the Node Manager will wait for a response to the health check query after which it will deem the monitored server Failed. In one embodiment, the default is 60 seconds.

AutoKillIfFailedEnabled=<true|false>

This parameter specifies if a Server is deemed Failed, this parameter will control whether NM will kill the Server or not. In one embodiment, the default is false.

HealthCheckStartDelaySeconds=<number of seconds>

The time that a server takes to startup depends upon the applications being deployed on it. The NM will wait for a server to complete its startup before the NM starts monitoring the server. This parameter specifies the length of time (in seconds) the NM will wait before starting its monitoring of the server. In one embodiment, the default is 120 seconds.

The HealthCheckIntervalSeconds and HealthCheckTimeoutSeconds and parameters can be defined per NM and on the NM command line. The AutoKillIfFailedEnabled and HealthCheckStartDelaySeconds parameters can be defined per server instance and can be modified at runtime via the Admin Console. These new parameters for the Server will be modifiable at runtime via the Admin Console. In conjunction with the parameter examples above, methods implemented in java code can be added to the server MBean and may be used to access or modify the parameters. Examples of these java methods include boolean getAutoKillIfFailedEnabled(), void setAutoKillIfFailedEnabled(boolean), int getHealthCheckStartDelaySeconds(), and void setHealthCheckStartDelaySeconds (int secs).

In one embodiment, the NM may allow its functionality and access to server health information to become available to external administrative clients. External administrative clients such as third party application monitors and high availability frameworks may need to be able to start and kill servers using the functionality of the NM. In one embodiment of the present invention, this is done programmatically with runtime MBeans. Use of an admin console is not required. The MBeans provide a programmatic interface to the NM's functionality. Further, the MBeans allow the NM's record of a server's health to be shared. Internal or external administrative clients may use the MBeans to access server health information collected by the NM. In one embodiment, the AS hosts [one]a NodeManagerRuntime MBean that provides methods to accomplish different tasks. Each machine may have one such MBean. [One task may involve starting a specified server.] In one embodiment, the AS may have methods according to the examples shown below.

java.io.reader start(serverMBean server) throws NodeManagerException;

This method starts the specified server. It then returns the reader to local log file containing output of executed command. The method throws NodeManagerException if any error occurs.

java.io.reader starInStandby (serverMBean server) throws NodeManagerException;

This method starts the specified server in Standby Mode. It then returns the reader to local log file containing output of executed command. The method throws NodeManagerException if any error occurs.

java.io.Reader shutdown (ServerMBean server) throws NodeManagerException;

This method shuts down the specified server. It then returns the reader to local log file containing output of executed command. The method throws NodeManagerException if any error occurs.

java.io.reader kill(ServerMBean server) throws NodeManagerException;

This method kills specified server. It is used to kill the server process when the server does not respond to shutdown operation. It then returns the reader to local log file containing output of executed command. The method throws NodeManagerException if any error occurs.

java.io.reader startMonitoring (ServerMBean server) throws NodeManagerException;

This method instructs the NM to start monitoring the specified server. The NM will automatically restart the server if it crashes (if auto restartEnabled is set to true) or gets into failed state (if AutoKillIfFailedEnabled and AutoRestartEnabled are set to true). It then returns the reader to local log file containing output of executed command. The method throws NodeManagerException if any error occurs.

java.io.reader stopmonitoring (serverMBean server) throws NodeManagerException;

This method instructs the NM to stop monitoring the specified server. It then returns the reader to local log file containing output of executed command. The method throws NodeManagerException if any error occurs.

java.io.Reader getlogs(Server MBean server, String type) throws NodeManagerException;

This method get logs from the NM for the specified server. The type is either "WL_output" or "WL_Error". It then returns the reader to local log file containing output of executed command. The method throws NodeManagerException if any error occurs.

string get state (ServerMBean server) throws NodeManagerException;

This method queries the NM for its view of the specified server state. It is used when the server does not respond to queries to its ServerRuntimeMBean. The method will return "unknown" if NM is either not monitoring the server or does not have any knowledge of the server. It then returns the reader to local log file containing output of executed command. The method throws NodeManagerException if any error occurs.

In another embodiment, MBeans may provide an interface for JMX clients to access the functionality of the NM. In this case, the MBeans for JMX client interfacing may have a different interface than the Server configuration MBeans. Operations such as "start" and "shutdown" may return precise information on their success or failure. They will throw an exception if the operation fails. All operations on the Node Manager Runtime MBeans may be blocking. A TaskMBean interface may be provided around the Server Lifecycle MBeans to provide an asynchronous interface to JMX clients. JMX clients can make use of the NM functionality to perform a wide variety of Server lifecycle and health monitoring control operations. Detailed below are the interactions between these two entities during each of the Server Lifecycle state transitions. Admin console, weblogic.Admin command line utility and other Admin Clients will be effecting these state transitions by invoking methods on the ServerLifecycleRuntimeMBean.

start() [SHUTDOWN->RUNNING]

startInStandby() [SHUTDOWN->STANDBY]

ServerLifecycleRuntimeMBean hosted on the Admin Server will invoke the start() or startInStandby() methods on the corresponding NodeManagerRuntimeMBean.

shutdown() [STANDBY->SHUTDOWN]

If a NM is configured, ServerLifecycleRuntimeMBean hosted on the Admin Server will invoke the shutdown() method on the corresponding NodeManagerRuntimeMBean. If not, it will invoke the shutdown() method on the ServerLifecycleRuntimeMBean hosted on the Managed Server.

getState()

ServerLifecycleRuntimeMBean hosted on the Managed Server will return the State attribute of the Server. ServerLifecycleRuntimeMBean hosted on the Admin Server will invoke the getState() method on the ServerLifecycleRuntimeMBean hosted on the Managed Server. If this operation times out, it will then invoke the getState() method on the NodeManagerRuntimeMBean.

Figure 4:
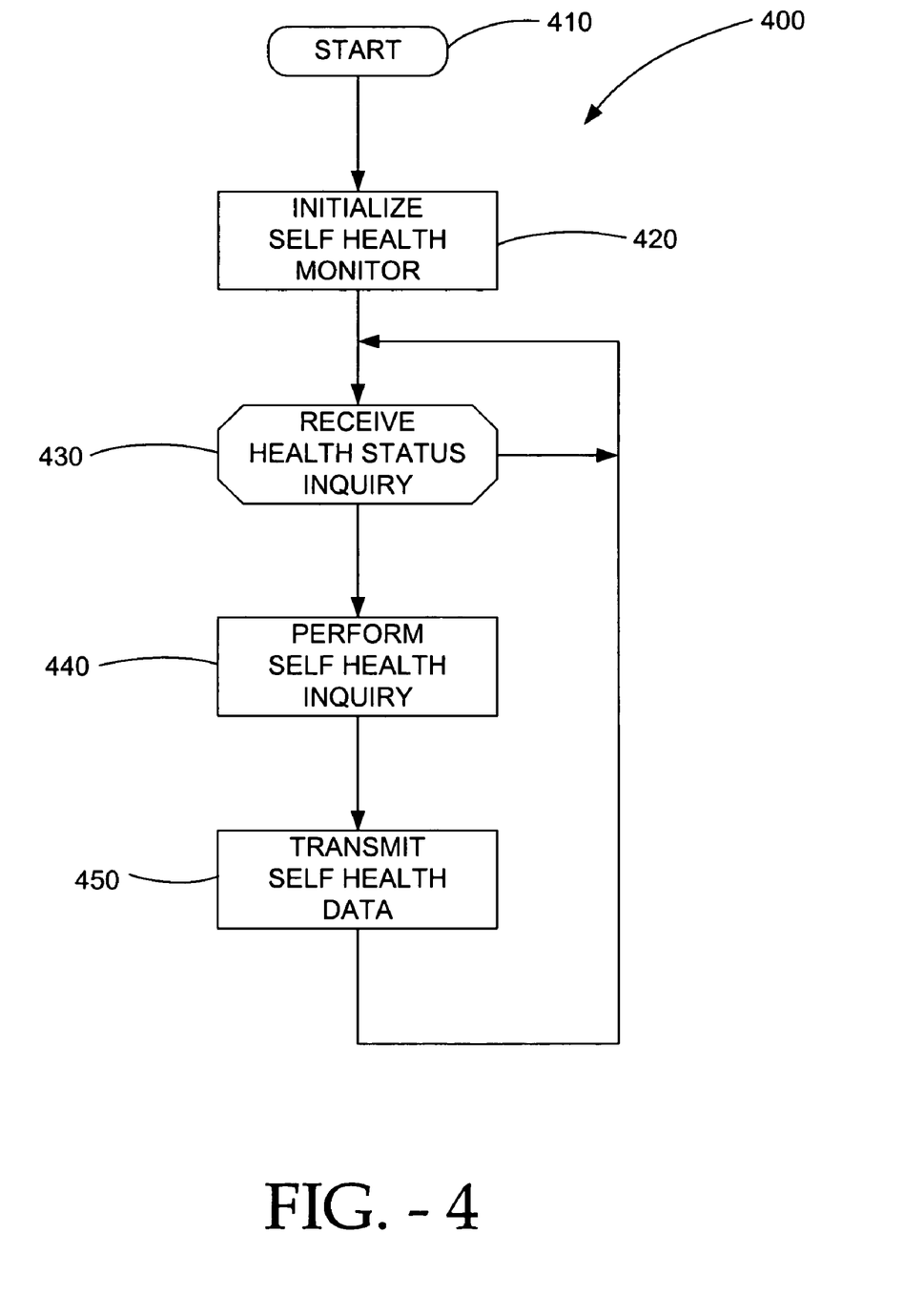
FIG. 4 is a diagram showing the operation of a managed server in a health monitoring system in accordance with one embodiment of the present invention.

The operation of a server that is monitored by a NM in accordance with one embodiment of the present invention is shown in diagram 400 of FIG. 4 and described as follows. The operation of flow chart 400 starts off with a start step 410. Next, the server is initialized in step 420. In one embodiment, the NM and the server establish a connection as part of the server initialization. While establishing the connection and initializing the server, the NM may pass the NM's listening address to the server. In one embodiment, server initialization includes the server initializing and running a program that monitors its health and interfaces with query attempts from the NM and other sources. Once a connection between the NM and the server is established and the server is initialized, the server may send a message to the NM indicating the server experienced a successful start up.

After initialization, the server listens for an inquiry regarding the server's health status in step 430. The health status inquiry may come from the NM or an external administrative agent. If no health status inquiry is received, the server continues to listen for an inquiry as shown in FIG. 4. If a health status inquiry is received, operation continues to step 440. In step 440, the server performs a self health check on itself. Next, the results of the health check are transmitted by the server in step 450. In one embodiment, the results are transmitted to the NM or the AS. In another embodiment, the results are transmitted according to the instructions of an external administrative agent. The administrative agent may have the results sent to the agent itself or some other entity. After transmitting the results of the self health inquiry, operation of the server returns to step 430 where the server listens for a health status inquiry. In one embodiment, if at any point the server fails, the server will inform the NM as soon as it enters a failed state.

Figure 5:
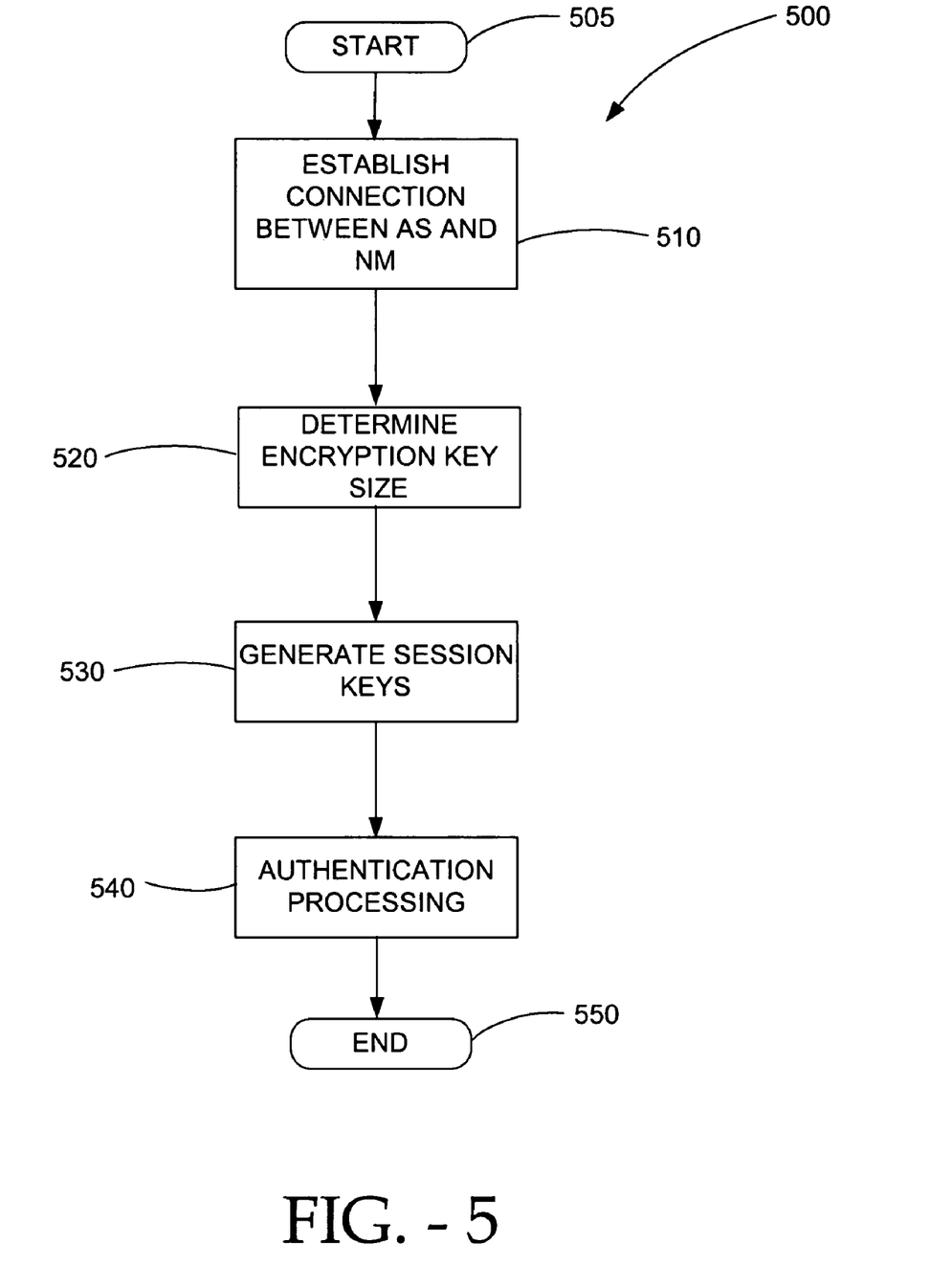
FIG. 5 is a diagram showing an encryption method for a self health monitoring system in accordance with one embodiment of the present invention.

The communication between the NM and the AS may be encoded to increase the integrity of the system. In one embodiment of the present invention, the communication may be encoded according to a Diffie-Helman based Authentication and Encryption scheme. The encryption parameters may be negotiated at link establishment time and depend upon configuration parameters and installed software. A flow chart showing the operation of a Diffie-Helman based Authentication and Encryption scheme 500 in accordance with one embodiment of the present invention is shown in FIG. 5. The operation starts at step 505. Next, the connection between the AS and NM is established in operation 510. In one embodiment, the connection between the AS and the NM is initialized by the AS. Once the connection has been initialized by the AS, the NM receives the initial connection. Next, the encryption key size is determined in step 520. In one embodiment, the encryption key size is determined by a negotiation between the AS and the NM. The AS and NM each have a minimum key length parameter and maximum key length parameter. The pair for each of the NM and AS is denoted as (min, max). The minimum key length parameter is the minimum encryption level a process will support. The maximum key length parameter is the maximum encryption level a process is will support. In one embodiment, the possible key lengths are 0, 40, or 128 bits.

The AS and NM will negotiate a connection that uses an encryption level as high as the lowest maximum key length between the NM and AS, but no lower than the highest minimum key length between the NM and AS. For example, if the AS has key length parameters of (0, 128), and the NM has key length parameters of (40, 128), the connection may have a key length of 40 or more preferably 128 bits. The key length may not be 0 bits because the NM has a minimum key length parameter of 40 bits. Once the key length for the connection has been established, the key length is in effect for the lifetime of the connection between the AS and NM. In one embodiment, the maximum key length parameter may be reduced by the capabilities of software installed on the NM or the AS. If the minimum key length parameter for either the AS or NM is higher than the maximum key length parameter for the other of the AS or NM, then no overlap exists in key length parameters. If there is no overlap in key length parameters, the established link will fail and an appropriate error message is logged. In one embodiment, command line arguments may be used to specify the minimum encryption level parameter and maximum encryption level parameter.

After the key size is determined, the session keys are generated in step 530. In one embodiment, a first session key is used for transmitted data from the AS to the NM and a second session key is used from for data transmitted from the NM to the AS. In one embodiment of the present invention, the session keys are 128 bits. The input parameters to the Diffie-Hellman key agreement algorithm may be fixed or generated. In one embodiment, the input parameters are fixed into software existing on the server network and accessible to the AS. The AS server may transmit the fixed input parameters to the NM. The Diffie-Hellman algorithm also requires the generation of a random number. In one embodiment, the random number is generated from a cryptographically secure pseudo-random number source. An RC4 bulk encryption method may be used as the encryption method for the link. The details of generating a session key using the Diffie-Hellman algorithm are generally known in the art and therefore not described here in detail.

Once the session keys are generated in step 530, the NM and AS may engage in an authentication process at step 540. In one embodiment, both the NM and AS are authenticated using a shared secret. One method of authenticating both the NM and AS in accordance with the present invention is as follows. First, both the NM and AS will generate a fingerprint. In one embodiment, the fingerprint may be a 128 bit MD5 message digest created using the send and receive session keys already negotiated. Next, the AS will generate a challenge, encrypt the challenge and fingerprint, and send the encrypted challenge and fingerprint to the NM. In one embodiment, the challenge may be a 64 bit random number. Next, the NM will receive and decrypt the challenge and fingerprint from the AS. The information may be encrypted and decrypted using the AS's password. If the information received by the NM is decrypted and does not match the NM's fingerprint, the NM will reject the authentication request by the AS. Next, the NM will encrypt the challenge received from the server, the session key generated by the NM, and the fingerprint generated by the NM. The NM will then send the encrypted challenge, session key, and fingerprint to the AS. The AS will receive and decrypt the information received from the NM. Upon decrypting the received information, the AS will compare the received challenge and fingerprint to it's own challenge and fingerprint. If either the fingerprints or the challenges do not match, the AS will reject the authentication request from the NM. If the comparisons performed by the AS and NM reveal matching information, then the authentication requests will be accepted. The encryption and authentication process then ends at step 550. The encryption by the AS and NM may be done using a DES encryption method or some other method suitable for the particular requirements of the system.

In one embodiment, new command line arguments are specified for the AS and NM regarding AS/NM communication encryption and authentication. These new arguments can be modified at runtime via the Admin Console. Arguments specified for the AS may include the examples listed below.

WebLogic.management.minEncryptionBit=<number>

This argument specifies the minimum encryption level the process will accept. Possible values are 0, 40, 128. In one embodiment, the default value is 0.

WebLogic.management.maxEncryptionBits=<number>

This argument specifies the maximum encryption level the process will accept. Possible values are 0, 40, 128. In one embodiment, the default value is 128.

WebLogic.management.enableChannelBinding=0 |1

This argument sets an Authentication Protocol. In one embodiment, the a value of 1 enables the Authentication Protocol and the default is 0.

WebLogic.management.passwordKey=<string>

This argument specifies the key to be used to decrypt the encrypted NM passwords stored in the configuration file. The key must be specified if WebLogic.management.enableChannelBinding is set to 1.

The utility WebLogic.wtc.gwt.genpasswd will be used to encrypt NM passwords to be stored in the configuration file.

Arguments specified for the NM may include the examples listed below.

WebLogic.nodemanager.minEncryptionBits=<number>

This argument specifies the minimum encryption level the process will accept. Possible values are 0, 40, 128. In one embodiment, the default value is 0.

WebLogic. nodemanager.maxEncryptionBits=<number>

This argument specifies the maximum encryption level the process will accept. Possible values are 0, 40, 128. In one embodiment, the default value is 128.

WebLogic.nodemanager.enableChannelBinding=0|1

This argument sets an Authentication Protocol enable. In one embodiment, a value of 1 enables the Authentication Protocol and the default is 0.

WebLogic. nodemanager.password=<string>

This argument specifies the NM password. The NM password must be specified if WebLogic.nodemanager.enableChannelBinding is set to 1.

WebLogic.nodemanager.adminServerPassword=<string>

This argument specifies the Admin Server password. Must be specified if WebLogic.nodemanager.enableChannelBinding is set to 1.

In one embodiment, an alternate NM may have features in addition to those described above. In particular, the alternate NM may function to aggregate administrative actions and information in the NM. The actions and information could then be accessed by third party application monitors and high availability frameworks using standard JMX interfaces. The NM may also achieve internal interactions with the admin console and cluster group leader using standard JMX interfaces.

In one embodiment, certain services are required by the administrator for the alternate NM to operate properly. One such service is a ProcessControl ("PC") service. The PC service operates to start, kill and restart managed servers on the local node. The service can be hosted by the AS and by the NM on the other nodes. Restart capability is provided to internal and external clients via Runtime MBeans. Another service is the HealthMonitoring ("HM") service. The HS service monitors state and other runtime attributes of managed servers on local or remote nodes. Either the AS or an individual NM can host the HM service. Server health information is provided to internal and external clients via Runtime MBeans.

The alternate NM has several advantageous characteristics. In one embodiment, some aspects of the configuration for the alternate NM are similar to the basic NM of the present invention. The alternate NM may be hosted on a stripped-down managed server. In this case, the alternate NM registers as a managed server with the AS. With this configuration, the NM performs startup independently of the AS. Further, no configuration MBeans are required for runtime configuration changes The alternate NM may include a "watchdog" service. The watchdog service operates to monitor the NM on platforms where operating system monitoring is not available, such as non-NT and Solaris platforms. The watchdog service maybe configured to spawn the NM when it performs startup, thereby allowing administrators to manually start just one process. In one embodiment, a system could use a watchdog service to bootstrap the NM service on a local node upon command of an AS. This watchdog service configuration would eliminate manual configuration of the NM on each remote node and allow runtime configuration through configuration MBeans implemented in java. For Solaris and NT systems, the NM may be used as the operating system in one embodiment of the present invention. In this case, the NM may be installed on a node in conjunction with other software and can be started manually.

The alternate NM can be configured to enable its operation to enhance aspects of an entire domain or local node. One NM could be used for an entire domain. This would simplify security in that multiple certificates would not need to be managed. In one embodiment, the NM is the highest release. The alternate NM may be used to aggregate cluster heartbeats for all cluster members on a local node. The cluster members may include managed servers on the local node. The alternate NM may also be configured to operate as a surrogate AS.

The present invention includes a Node Manager that monitors the status of multiple servers. The NM detects server failures, periodically monitors server health status, and performs server maintenance. When the NM detects a server failure, it determines whether or not the server should be restarted. While periodically monitoring servers, the NM may determine how often to trigger a health check, how long to wait for a response, and how to proceed if the server is deemed failed. The NM may be controlled by an AS directly or by an external administrative agent. An administrative agent may control the NM by interfacing with the AS. The NM and AS may authenticate each other and encode their communications to each other for increased security.

An Appendix is attached to this application containing examples within the scope and spirit of the present invention.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for implementing Node Managers.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for monitoring a server comprising:
   at least one server operable to transmit and receive messages;
   a server manager having a memory and operable to transmit messages to and receive messages from said at least one server, wherein the server manager monitors and performs maintenance on said at least one server; and a connection established between said at least one server and said server manager, said server manager operable to monitor health of said at least one server through said connection by invoking an asynchronous servlet deployed on said server such that the server manager detects degenerate health of said server by receiving server health information from the asynchronous servlet and determines whether or not to restart said server upon the detection of the degenerate health;

wherein determining whether or not to restart said server includes the server manager is capable of determining whether a condition exists that will prevent said server from being restarted by using a restart parameter that tracks how many times restarting has been attempted and a maximum restart parameter that specifies how many times restarting should be attempted.

2. A system as claimed in claim 1 further comprising:
an administrative server that may control the functionality of the sewer manager.

3. A system as claimed in claim 2 wherein the administrative server may be interfaced by a user.

4. A system as claimed in claim 2 wherein the administrative sewer may be interfaced by external administration agents.

5. The system of claim 2 wherein said administrative server hosts a java MBean, the java MBean configured to control the functionality of the server manager.

6. The system of claim 5 wherein the java MBean may be accessed externally by an administrative client.

7. The system of claim 6 wherein the java MBean offers the functionality of the server manager and access to monitoring said at least one server to clients in a programmatic manner.

8. The system of claim 2 wherein said administrative server hosts a java MBean, the java MBean configured to provide an interface for JMX clients to control the functionality of the server manager.

9. The system of claim 1 wherein monitoring said at least one server is configured to be accessed using a java MBean.

10. The system of claim 1 wherein the condition limits the server to a maximum number of restarts permitted during a specific period of time.

11. The system of claim 1 wherein the asynchronous servlet returns server health information upon an occurrence of a specified event.

* * * * *

UNITED STATES PATENT AND TRADEMARK OFFICE
CERTIFICATE OF CORRECTION

PATENT NO. : 7,287,075 B2
APPLICATION NO. : 10/339144
DATED : October 23, 2007
INVENTOR(S) : Rahul Srivastava et al.

Page 1 of 1

It is certified that error appears in the above-identified patent and that said Letters Patent is hereby corrected as shown below:

Column 15, claim 2, line 19: delete "sewer" and insert therefor --server--

Column 15, claim 4, line 23: delete "sewer" and insert therefor --server--

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO.       : 7,287,075 B2                                           Page 1 of 1
APPLICATION NO. : 10/339144
DATED            : October 23, 2007
INVENTOR(S)      : Srivastava et al.

It is certified that error appears in the above-identified patent and that said Letters Patent is hereby corrected as shown below:

On page 2, in column 2, under "Other Publications", line 1, delete "Extension" and insert
-- Extensions --, therefor.

In the drawings, delete FIG. 5 and insert the following therefor:

FIG. - 5

In column 12, line 23, after "embodiment," delete "the".

In column 13, line 17, after "changes" insert -- . --.

In column 13, line 21, delete "maybe" and insert -- may be --, therefor.

Signed and Sealed this

Fifth Day of October, 2010

David J. Kappos
Director of the United States Patent and Trademark Office